United States Patent [19]
Hofer et al.

[11] 3,771,992
[45] Nov. 13, 1973

[54] 2-CHLOROETHANETHIOPHOSPHONIC ACID DICHLORIDE AS PLANT GROWTH INFLUENCING AGENT

[75] Inventors: Wolfgang Hofer, Wuppertal-Vohwinkel; Reinhard Schliebs, Cologne; Robert Rudolf Schmidt, Leverkusen; Ludwig Eue, Cologne, all of Germany

[73] Assignee: Bayer Aktiengesellschaft, Leverkusen, Germany

[22] Filed: Sept. 23, 1970

[21] Appl. No.: 74,899

[52] U.S. Cl............................. 71/76, 71/77, 71/78, 71/71, 71/87
[51] Int. Cl............................................. A01n 9/36
[58] Field of Search........................... 71/87, 76, 86; 260/543

[56] References Cited
FOREIGN PATENTS OR APPLICATIONS
217,394   5/1968   U.S.S.R.

OTHER PUBLICATIONS
Fritz et al. "Phosphonate Plant Growth Regulators" S. African Pat. No. 6,801,036, Jan. 15, 1969, Chem. Abst. Vol. 71 (1969) 111774r.

Primary Examiner—Lewis Gotts
Assistant Examiner—Catherine L. Mills
Attorney—Burgess, Dinklage & Sprung

[57] ABSTRACT

2-Chloroethanethiophosphonic acid dichloride possesses exceptional plant growth influencing activity, e.g., in inhibiting growth or destroying of plants, in defoliation, and in acceleration of plant growth to, e.g., speedily ripen fruit.

1 Claim, No Drawings

2-CHLOROETHANETHIOPHOSPHONIC ACID DICHLORIDE AS PLANT GROWTH INFLUENCING AGENT

The present invention relates to the use of a thionophosphonic acid derivative as agent for regulating plant growth.

It is known from Dutch Pat. application No. 6,802,633 and French Pat. Spec. No. 1,555,173 that 2-chloroethanephosphonic acid possesses plant-growth-regulating properties.

The present invention provides a compositon for the control of plant growth containing as active ingredient 2-chloroethanethionophosphonic acid dichloride of the formula

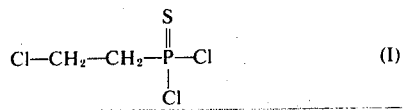

in admixture with a solid diluent or carrier or in admixture with a liquid diluent or carrier containing a surface-active agent. The invention also provides a method for influencing plant growth which comprises applying to the plant or seed thereof the compound of the above formula alone or in the form of a composition containing as active ingredient the compound of the above formula in admixture with a solid or liquid diluent or carrier.

Surprisingly, 2chloroethanethionophosphonic acid dichloride shows a noteworthily higher plant-growth-regulating activity than the 2-chloroethanephosphonic acid known in the prior art which is chemically the closest known compound having the same type of bioactivity. The activity of the conventional phosphonic acid compound is, however, not always wholly satisfactory, particularly at low concentrations. The compound used in accordance with this invention therefore represents a genuine enrichment of the art.

The substance used in this invention is known per se from, e.g., Russion Pat. No. 217,394 but its use as plant growth regulator was neither known or predictable.

The compound may be prepared by causing phosphorus pentasulphide to act on 2-chloroethanephosphonic acid dichloride, at elevated temperature (see Example 1, below).

2-Chloroethanethionophosphonic acid dichloride interferes with the physiological phenomena of plant growth and can therefore be used as plant growth regulator.

The different effects of the active compound depend essentially on the point in time of the application, with reference to the development stage of the seed or the plant, as well as on the dosage and concentrations of compound applied.

Plant growth regulators are used for various purposes which are connected with the development stage of the plant. Thus, by use of plant growth regulators, the seed germination can, depending on the concentration applied, either be inhibited or promoted. This inhibition or promotion relates to the seedling development.

The bud dormancy of the plants, that is to say the endogenic annual cycle, can be influenced by the active compound, so that the plants for example shoot or blossom at a point in time at which they normally show no readiness to shoot or blossom.

The shoot or root growth can be promoted or inhibited by the active compound in manner dependent on concentration. Thus, it is possible to inhibit very strongly the growth of the fully formed plant, or to bring the plant as a whole to a more robust habitus or to produce a dwarf growth.

Economic applications include the suppression of grass growth at roadsides and waysides, and the inhibition of the growth of lawns so that the frequency of grass-cutting (i.e., of lawn-mowing) can be reduced.

During the growth of the plant, the branching to the side can be multiplied by a chemical breaking of the apical dominance. This is particularly useful in the case of propagation of plants by cuttings. In concentration-dependent manner, however, it is also possible to inhibit the growth of side-shoots, for example in order to prevent the formation of side-shoots in tobacco plants after decapitation and thus to promote the leaf growth.

In the case of the influencing of blossom formation, there can be achieved, in manner dependent on concentration and the point in time of the application, either a retarding or an acceleration of blossom formation. In certain circumstances, a multiplication of blossom initiation can also be attained, these effects occurring when the appropriate treatments are carried out at the time of the normal blossom formation.

The influence of the active compound on the foliage of the plants can be so regulated that a defoliation is achieved for example in order to facilitate the harvest or to reduce transpiration at a time at which the plants are to be transplanted.

Fruit initiation can be promoted so that more fruits or seeless fruits are formed (parthenocarpy). Under certain conditions, the premature fall of fruit can also be prevented, or the fruit fall can be promoted up to a certain extent in the sense of a chemical thinning out. The property of promoting the fruit fall can also be exploited by effecting the treatmnet at the time of the harvest, whereby harvesting may be facilitated.

By spraying the unripe fruits with the compund according to the invention, the ripening process can also be accelerated and a better coloring of the fruits can be achieved.

The active compound to be used according to the present invention can be converted into the usual formulations, such as solutions, emulsions, suspensions, powders, pastes, and granulates. These may be produced in known manner, for example by mixing the active compound with extenders, that is, liquid or solid diluents or carriers, optionally with the use of surface-active agents, that is emulsifying agents and/or dispersing agents. In the case of the use of water as an extender, organic solvents can for example also be used as auxiliary solvents.

As liquid diluents or carriers, there are preferably used aromatic hydrocarbons, such as xylenes or benzene, chlorinated aromatic hydrocarbons, such as chlorobenzenes, paraffins such as mineral oil fractions, alcohols, such as methanol or butanol, or strongly polar solvents, such as dimethyl formamide or dimethyl sulfoxide, as well as water.

As solid diluents or carriers, there are preferably used ground natural minerals, such as kaolins, clays, talc or chalk, or ground synthetic minerals, such as highly-dispersed silicic acid or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl sulfonates and aryl sulfonates; and preferred examples of dispersing agents include lignin, sulphite waste liquors and methyl cellulose.

The formulations contain, in general, from 0.1 to 95, preferably 0.5 to 90, percent by weight of active compound.

The active compound may be applied as such or in the form of its formulations or of the application forms prepared therefrom, such as ready-to-use solutions, emulsifiable concentrates, emulsions, suspensions, spray powders, pastes, soluble powders, dusting agents and granulates. Application may take place in the usual manner, for example, by watering, squirting, spraying, scattering, dusting, etc.

The concentrations of active compound can be varied within a fairly wide range for actual application. In general, concentrations of 0.0005 to 2 percent by weight, preferably 0.01 to 0.5 percent are used.

Further, there are applied, in general, 0.1 to 100 kg, preferably 1 to 10 kg, of active compound per hectare.

The application of the growth regulator is normally effected within a preferred time period, the precise delimitation of which is governed by the climatic and vegetative circumstances, as is known in the art.

The following examples illustrate particular embodiments of the invention and are not to be construed as limitative thereof.

EXAMPLE A

Growth inhibition/oat grains
Solvent: 40 parts by weight acetone
Emulsifier: 0.25 part by weight alkylaryl polyglycol ether To produce a suitable preparation of active compound, 1 part by weight of active compound was mixed with the stated amount of emulsifier, and the concentrate was diluted with a disodium hydrogen phosphate-potassium dihydrogen phosphate buffer solution (pH 6) to the desired concentration.

Two batches of 25 oats grains were each laid out on a filter paper in a Petri dish. Ten ml. of the preparation of active compound were pipetted into each dish. Germination of the seeds took place in the dark at 25°C.

After 3 days, the length of the shoot and the roots is determined and the growth inhibition compared with the control plant was expressed as a percentage. One hundred percent denoted the standstill of growth, and 0 percent denoted a growth corresponding to that of the untreated plant.

The results can be seen from Table A.

TABLE A.—GROWTH INHIBITION/OAT GRAINS

| Active compound | 0 percent inhibition with 250 ppm (= mg/kg) concentrate of active compound | |
|---|---|---|
| | Root | Shoot |
| Water (Control) | 0 | 0 |
| $Cl-CH_2-CH_2-\overset{\overset{O}{\|}}{\underset{OH}{P}}-OH$ (known) | 84 | 80 |
| $Cl-CH_2-CH_2-\overset{\overset{S}{\|}}{\underset{Cl}{P}}-Cl$ (1) | 95 | 97 |

EXAMPLE B

Growth inhibition/apple seedlings
Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (ph 6) to the desired concentration.

Apple seedlings were, at a height of about 2 cm, sprayed with a preparation which contained 5,000 ppm of active compound. After 7 days, the percentage inhibition of the treated plants compared with the untreated control plant was determined. With 100 percent inhibition, no growth was present; with 0 percent inhibition the growth corresponded to that of the control plant.

Table B shows the results.

TABLE B.—GROWTH INHIBITION/APPLE SEEDLINGS

| Active compound | Percent inhibition with 5000 ppm concentration of active compound |
|---|---|
| Water (Control) | 0 |
| $Cl-CH_2-CH_2-\overset{\overset{O}{\|}}{\underset{OH}{P}}-OH$ (known) | 62 |
| $Cl-CH_2-CH_2-\overset{\overset{S}{\|}}{\underset{Cl}{P}}-Cl$ (1) | 80 |

EXAMPLE C

Growth inhibition and defoliation/beans
Solvent: 40 parts by weight acetone
Emulsifier: 0.25 part by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Three bean plants (*Phaseolus vulgaris*) were grown in a vessel. At a height of 10 cm, they were sprayed with preparations which contained 5,000 ppm of active compound.

After 6 days, the average length and the number of leaves of three beans per experiment were evaluated.

The results can be seen from Table C.

TABLE C.—GROWTH INHIBITION AND DEFOLIATION/BEANS

| Active compound | Length in cm | Number of leaves |
|---|---|---|
| Water (Control) | 17.0 | 6 |
| $Cl-CH_2-CH_2-\underset{\underset{OH}{\|}}{\overset{\overset{O}{\|}}{P}}-OH$ (known) | 11.0 | 4 |
| $Cl-CH_2-CH_2-\underset{\underset{Cl}{\|}}{\overset{\overset{S}{\|}}{P}}-Cl$ (1) | 10.0 | 0 |

EXAMPLE D

Growth inhibition/wheat
Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Wheat plants of a size of 4 cm were sprayed with a preparation which contained 5,000 ppm of active compound. After 10 days, the average length of the wheat was evaluated.

Table D shows the results.

TABLE D.—GROWTH INHIBITION/WHEAT

| Active compound | Length in cm |
|---|---|
| Water (Control) | 20.0 |
| $Cl-CH_2-CH_2-\underset{\underset{OH}{\|}}{\overset{\overset{O}{\|}}{P}}-OH$ (known) | 6.5 |
| $Cl-CH_2-CH_2-\underset{\underset{Cl}{\|}}{\overset{\overset{S}{\|}}{P}}-Cl$ (1) | 6.0 |

EXAMPLE E

Growth inhibition/beans (watering test)
Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Three bean plants (of a height of 10 cm) in a pot (9 cm in diameter) were watered once with a preparation of active compound corresponding to an applied amount of 10 kg/hectare. After 8 days, the length of the beans was determined.

The results can be seen from Table E.

TABLE E.—GROWTH INHIBITION/BEANS (WATERING TEST)

| Active compound | Length in cm |
|---|---|
| Water (Control) | 25.0 |
| $Cl-CH_2-CH_2-\underset{\underset{OH}{\|}}{\overset{\overset{O}{\|}}{P}}-OH$ (known) | 14.0 |
| $Cl-CH_2-CH_2-\underset{\underset{Cl}{\|}}{\overset{\overset{S}{\|}}{P}}-Cl$ (1) | 11.0 |

EXAMPLE F

Acceleration of fruit ripeness/tomato plants
Solvent: 40 parts by weight acetone
Emulsifier: 0.25 parts by weight alkylaryl polyglycol ether To produce a suitable preparation of active compound, 1 part by weight of active compound was mixed with the stated amount of solvent which contained the stated amount of emulsifier, and the concentrate was diluted with a disodium hydrogen phosphate-potassium dihydrogen phosphate buffer solution (pH 6) to the desired concentration.

Green, unripe fruits of tomato plants were sprayed once with a preparation which contained 5,000 ppm of active compound. An accelerated ripening of the fruits was thereby achieved.

The results can be seen from Table F.

TABLE F.—ACCELERATION OF FRUIT RIPENESS/TOMATO PLANTS

| Active Compound | Acceleration of ripeness in days |
|---|---|
| Water (Control) | 0 |
| $Cl-CH_2-CH_2-\underset{\underset{OH}{\|}}{\overset{\overset{O}{\|}}{P}}-OH$ (known) | 12 |
| $Cl-CH_2-CH_2-\underset{\underset{Cl}{\|}}{\overset{\overset{S}{\|}}{P}}-Cl$ (1) | 16 |

The preparation of active compound used according to the invention is illustrated by the following Example 1.

EXAMPLE 1

181.5 grams (1 mole) 2-chloroethane-phosphonic acid dichloride and 45 grams (0.11 mole) phosphorus pentasulfide ($P_4S_{10}$) were slowly heated to 200°C. and stirring at 200°C was effected until a clear solution forms (about 1 hour). After cooling to room temperature, the reaction mixture was extracted with petroleum ether. After the petroleum ether had been drawn off, distillation was effected. B.p. 79°–82°C/5 mm Hg. A colorless liquid with the refractive indix $n_D^{26}$ : 1.5613 was obtained.

Yield: 111 grams (56 percent of the theory).

What is claimed is:

1. Method of inhibiting plant growth which comprises applying to the plant or seed or its habitat 2-chloroethanethionophosphonic acid dichloride in amounts effective to inhibit plant growth.

* * * * *

PO-1050
(5/69)

UNITED STATES PATENT OFFICE
CERTIFICATE OF CORRECTION

Patent No. 3,771,992      Dated November 13, 1973

Inventor(s) Wolfgang Hofer, Reinhard Schliebs, Robert Rudolf Schmidt and Ludwig Eue It is certified that error appears in the above-identified patent and that said Letters Patent are hereby corrected as shown below:

Page 1, insert after U.S. filing date the following:

--claims priority of German Patent Application No. P 19 49 461.2 filed October 1, 1969--.

Signed and sealed this 16th day of April 1974.

(SEAL)
Attest:

EDWARD M.FLETCHER,JR.
Attesting Officer

C. MARSHALL DANN
Commissioner of Patents